F. X. MALOCSAY.
BANDING MACHINE.
APPLICATION FILED NOV. 18, 1915.

1,261,831.

Patented Apr. 9, 1918.
14 SHEETS—SHEET 1.

Witnesses:   Inventor
   Francis X. Malocsay
   By his Attorney

F. X. MALOCSAY.
BANDING MACHINE.
APPLICATION FILED NOV. 18, 1915.

1,261,831.

Patented Apr. 9, 1918.
14 SHEETS—SHEET 2.

Witnesses:

Inventor
Francis X. Malocsay
By his Attorney

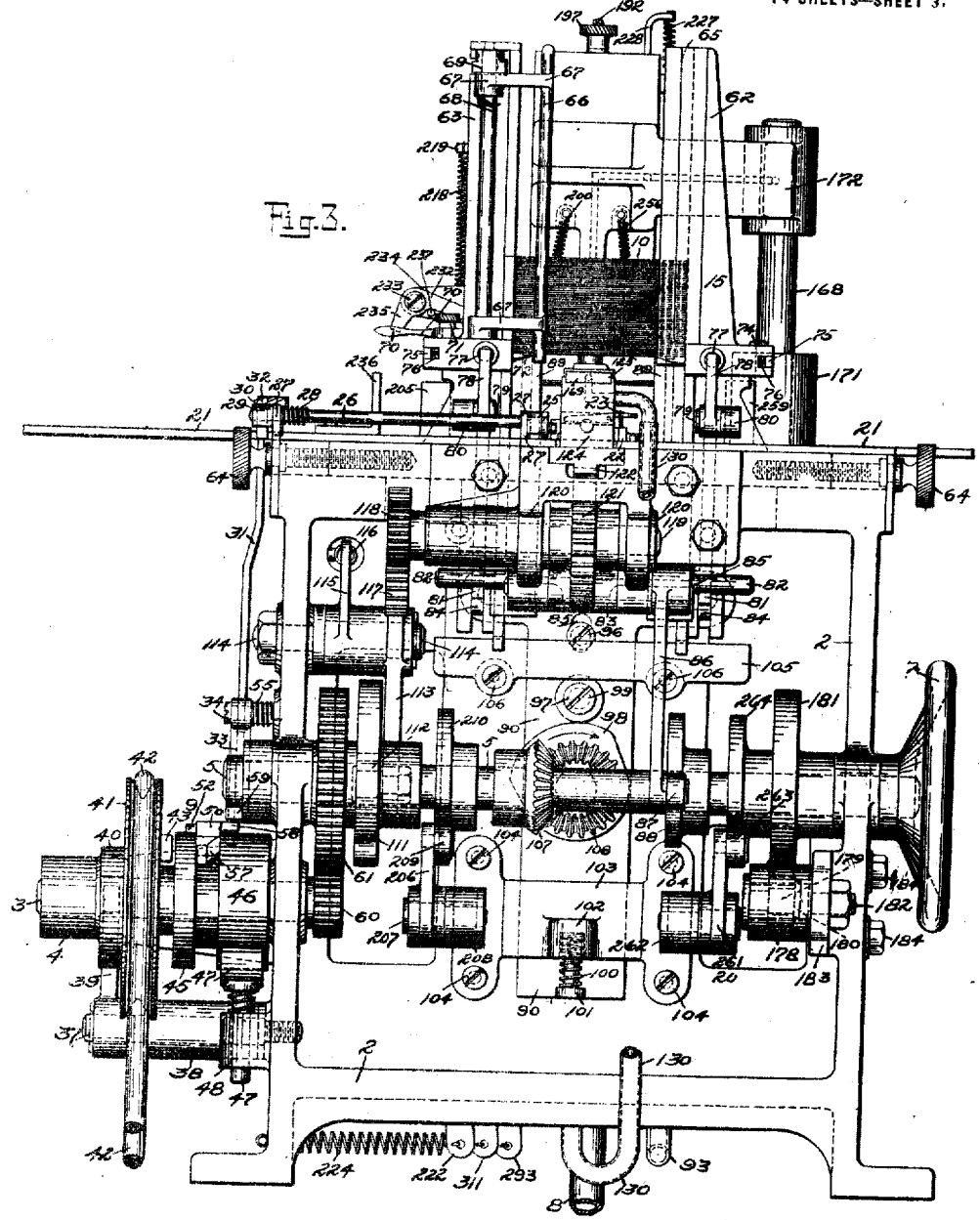

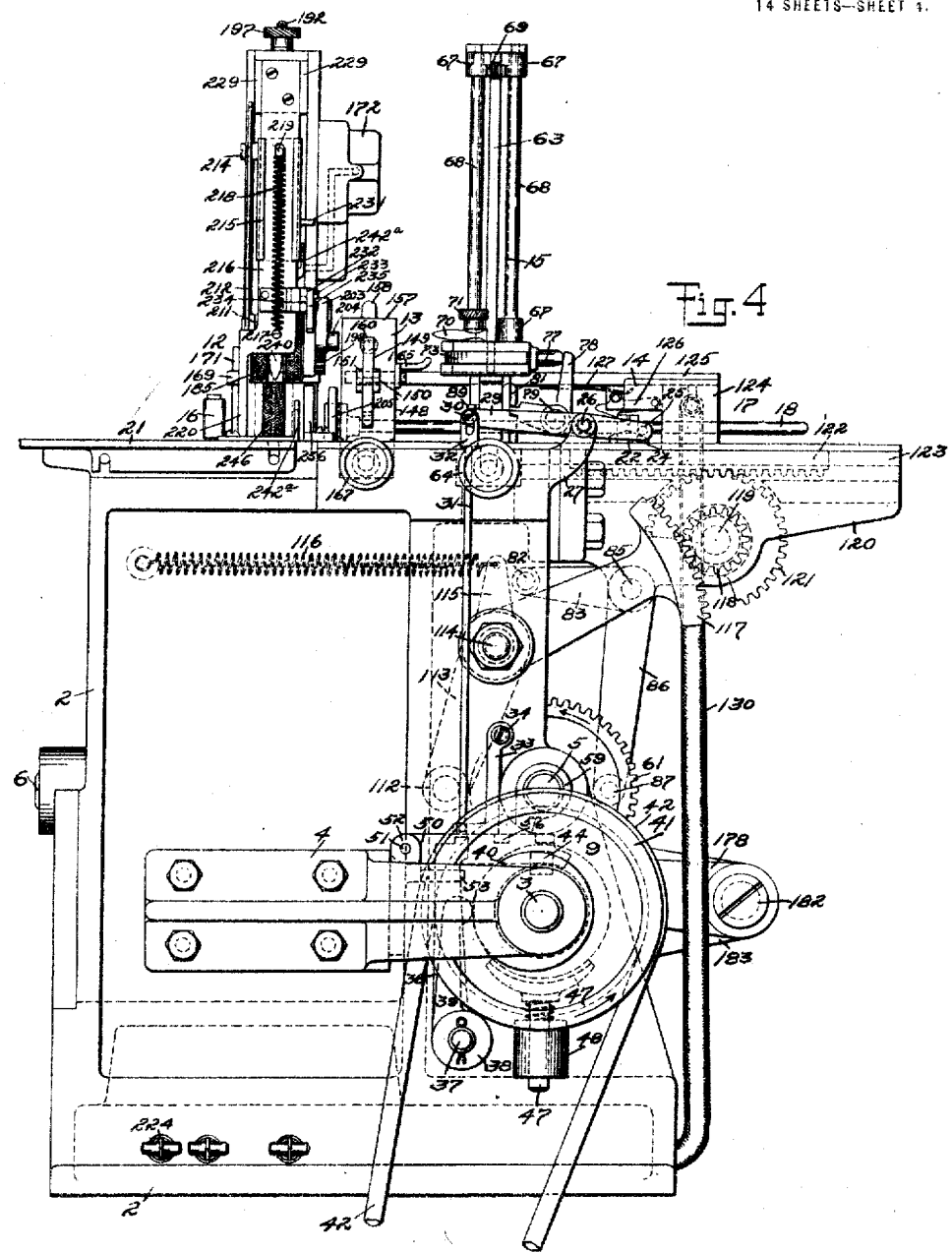

F. X. MALOCSAY.
BANDING MACHINE.
APPLICATION FILED NOV. 18, 1915.

1,261,831.

Patented Apr. 9, 1918.
14 SHEETS—SHEET 5.

Witnesses:
Inventor
Francis X. Malocsay
By his Attorney

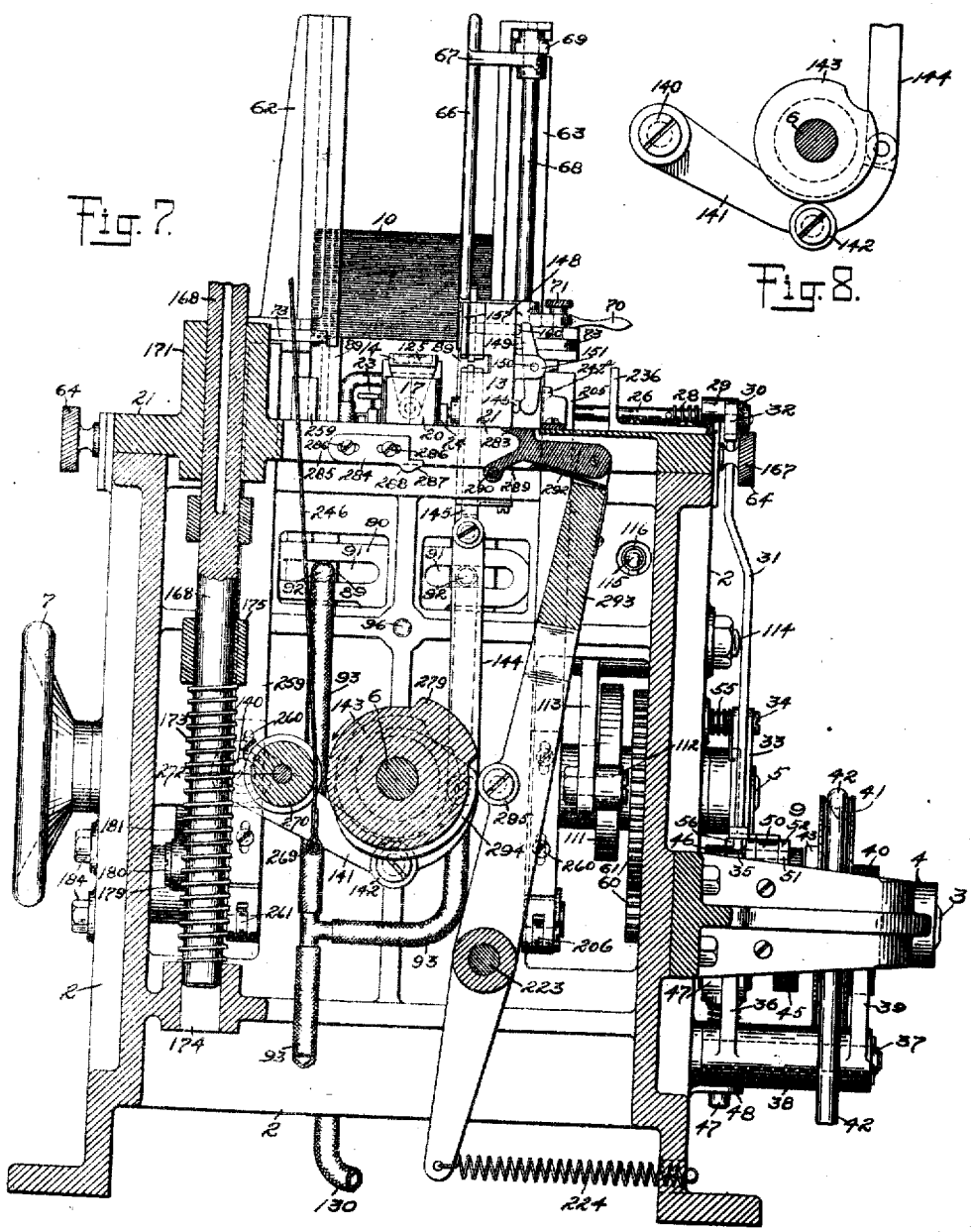

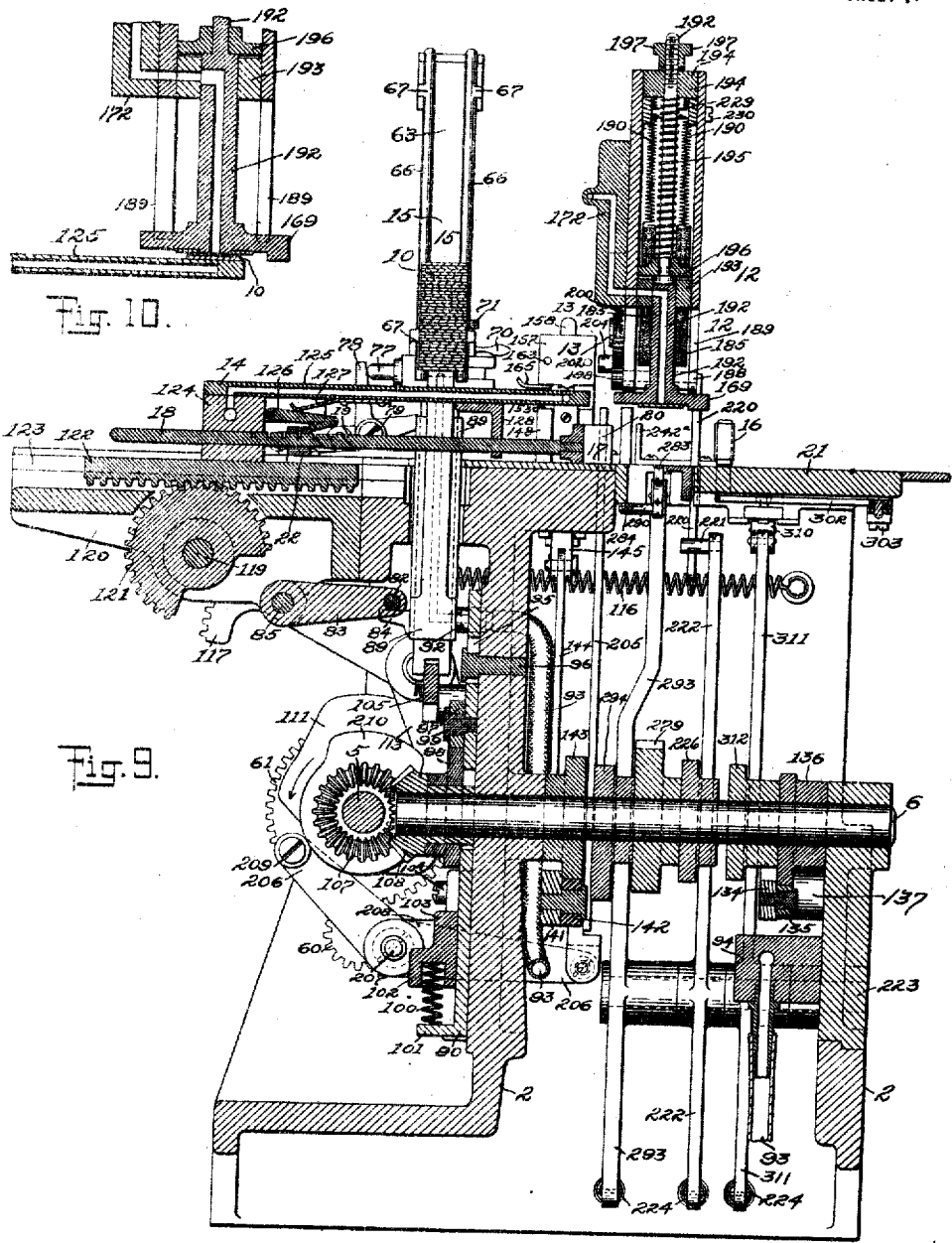

F. X. MALOCSAY.
BANDING MACHINE.
APPLICATION FILED NOV. 18, 1915.

1,261,831.

Patented Apr. 9, 1918.
14 SHEETS—SHEET 8.

Witnesses:

Inventor
Francis X. Malocsay
By his Attorney

F. X. MALOCSAY.
BANDING MACHINE.
APPLICATION FILED NOV. 18, 1915.

1,261,831.

Patented Apr. 9, 1918.
14 SHEETS—SHEET 9.

Witnesses:

Inventor
Francis X. Malocsay
By his Attorney

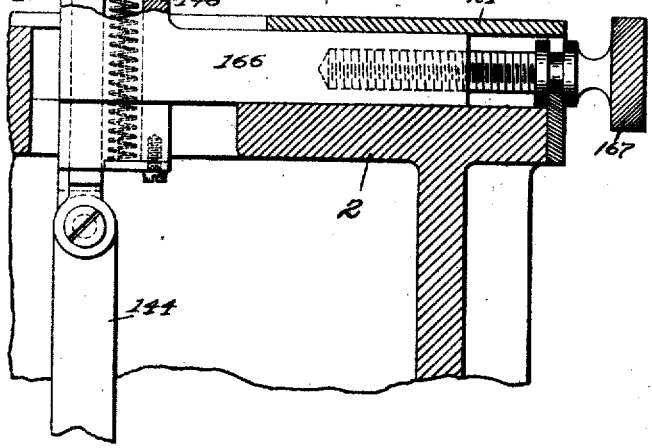

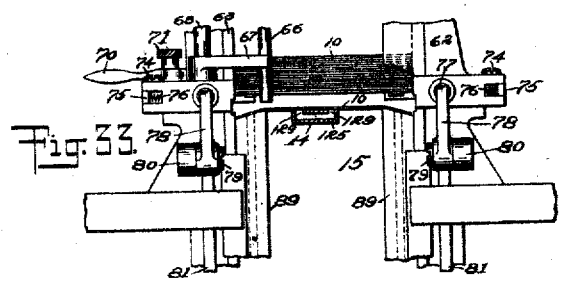

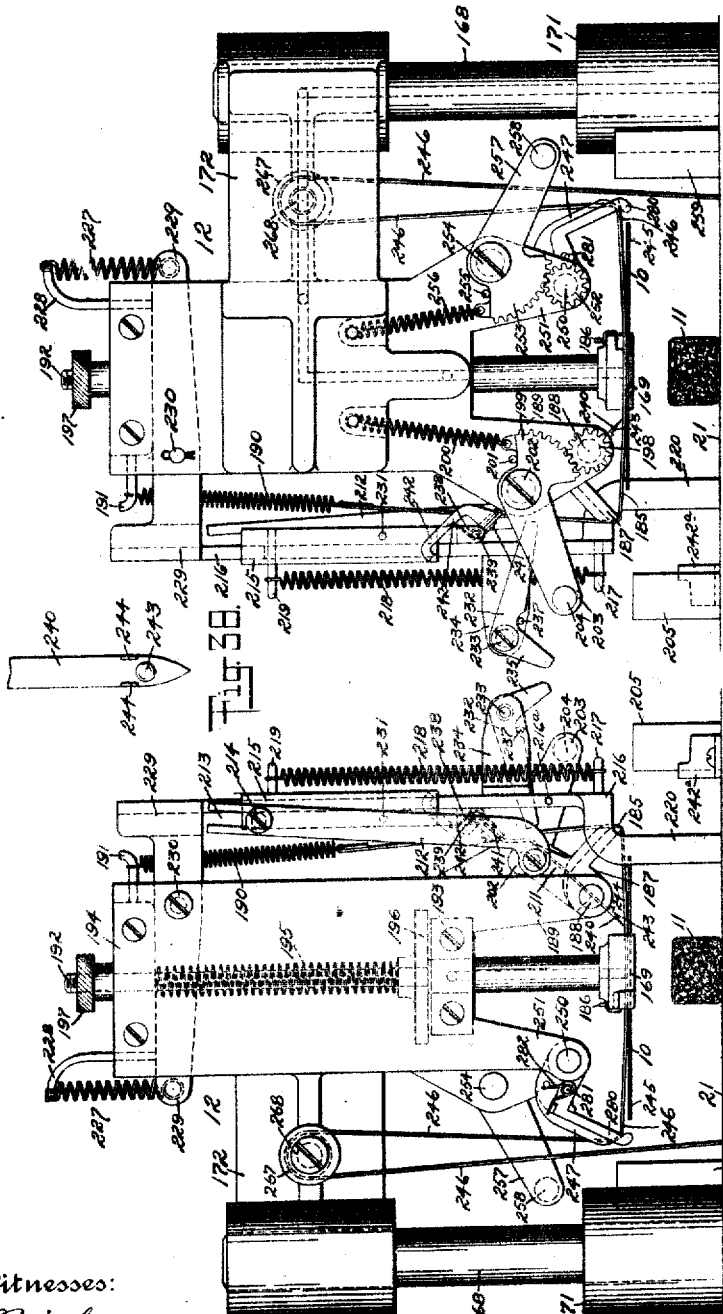

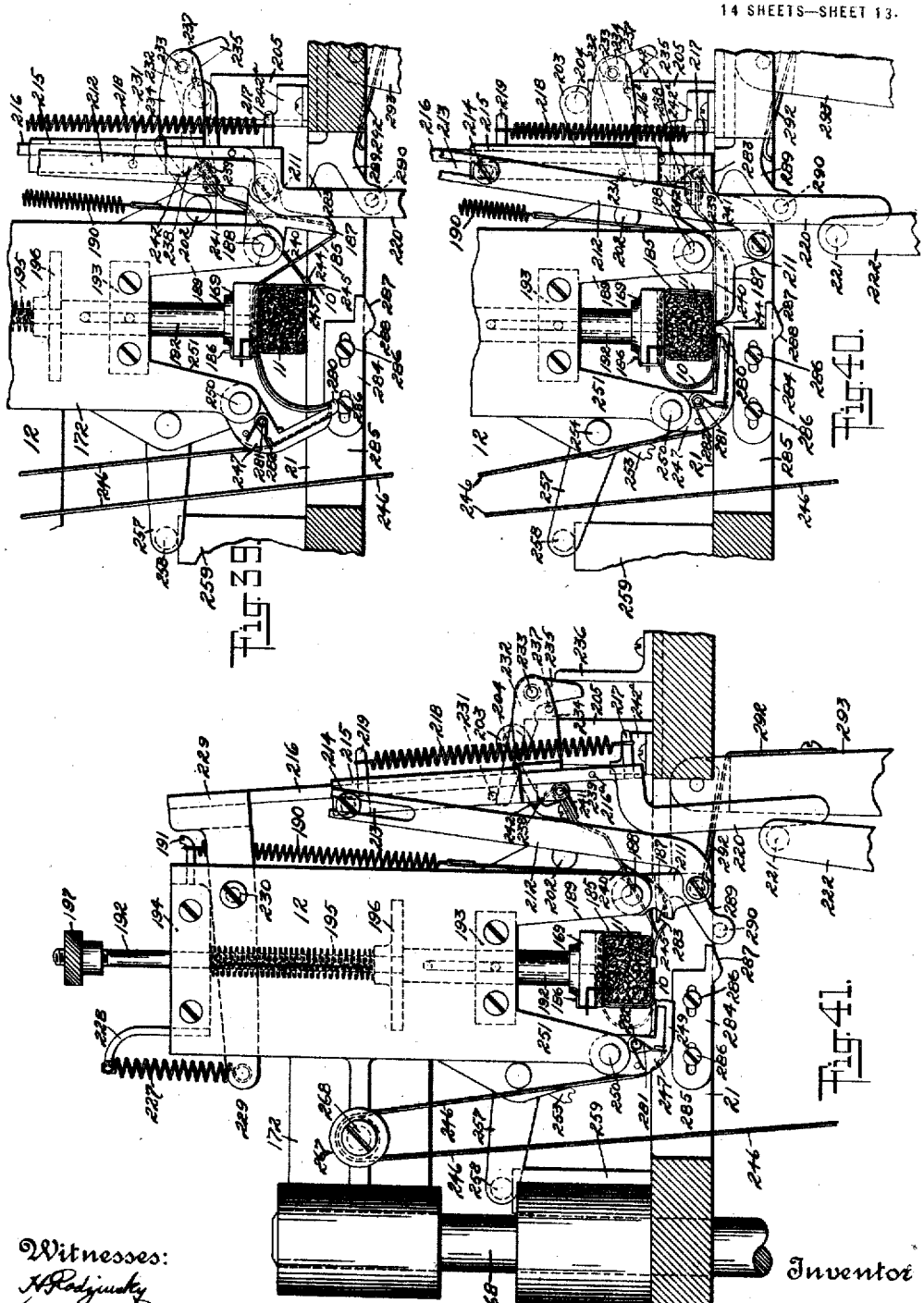

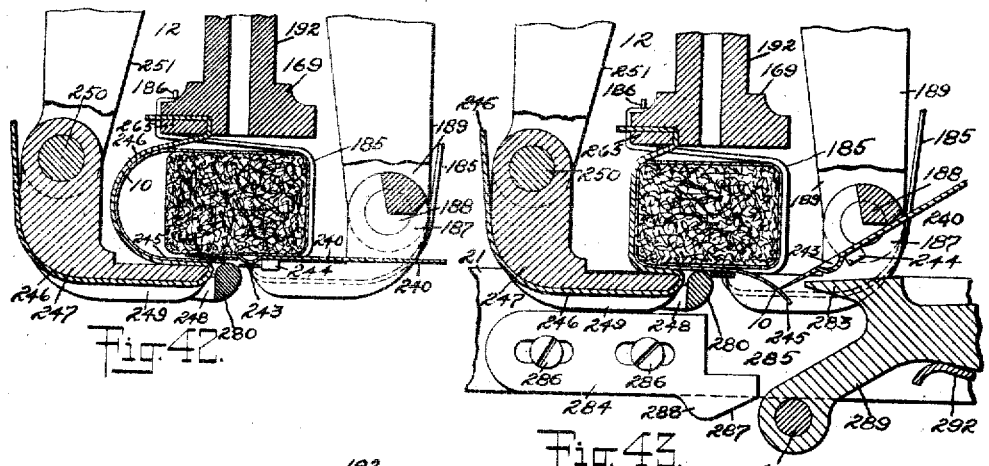
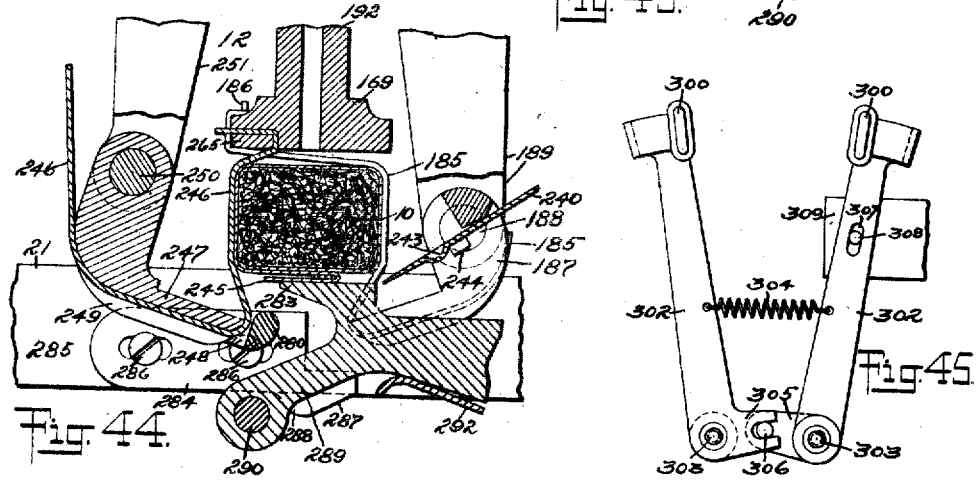
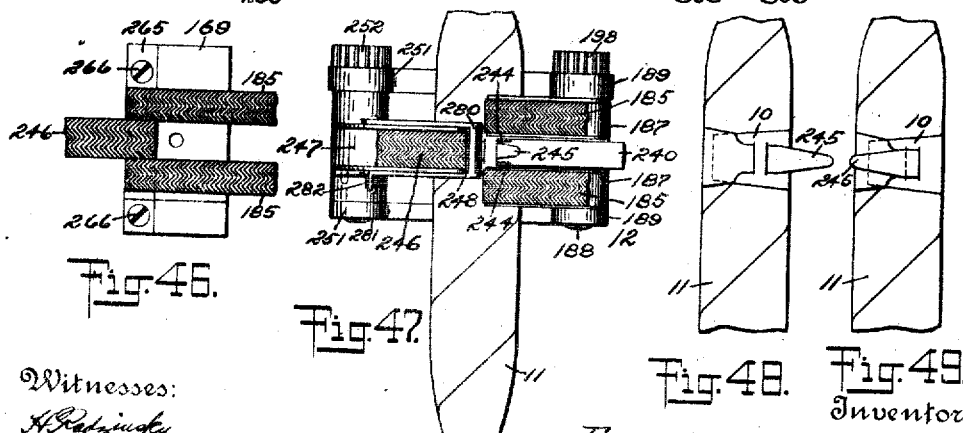

UNITED STATES PATENT OFFICE.

FRANCIS X. MALOCSAY, OF NEW YORK, N. Y., ASSIGNOR TO INTERNATIONAL BANDING MACHINE COMPANY, OF NEW YORK, N. Y., A CORPORATION OF NEW YORK.

BANDING-MACHINE.

1,261,831.  Specification of Letters Patent.  Patented Apr. 9, 1918.

Application filed November 18, 1915. Serial No. 62,160.

*To all whom it may concern:*

Be it known that I, FRANCIS X. MALOCSAY, a citizen of the United States, and a resident of the city of New York, county of Bronx, and State of New York, have invented a new and useful Improvement in Banding-Machines, of which the following is a specification.

The object of my invention is to provide a machine which will band cigars or other articles without the use of any paste or other adhesive. This object is accomplished by my machine which takes a band from a stack, perforates one end of the band, then wraps it about the object to be engaged, such as a cigar, and passes one end of the band through the perforated end and folds the tongue end back after the band is drawn tight about the article so that the article is banded in a neat and attractive manner, without the use of paste or any other adhesive, and with an extending tongue which facilitates its removal.

For a more detailed description of my invention, reference is to be had to the accompanying drawings, forming a part hereof, in which—

Figure 1 is a front elevation of my improved banding machine.

Fig. 1ª is a side elevation of my ejector which prevents a band from being injured when the banded article is ejected.

Fig. 3 is a rear elevation of the machine.

Fig. 4 is a side elevation taken from the right of Fig. 1.

Fig. 7 is a cross-section taken substantially on the line 7—7 of Fig. 2, looking in the direction of the arrows, parts being removed to reveal what would otherwise be concealed.

Fig. 8 is a detail view showing a cam and connected parts for operating the perforating mechanism.

Fig. 9 is a sectional view, taken substantially on the line 9—9 of Fig. 2, looking in the direction of the arrows.

Fig. 10 is a sectional view, showing in detail a portion of the band applying mechanism.

Figures 1, 1A:
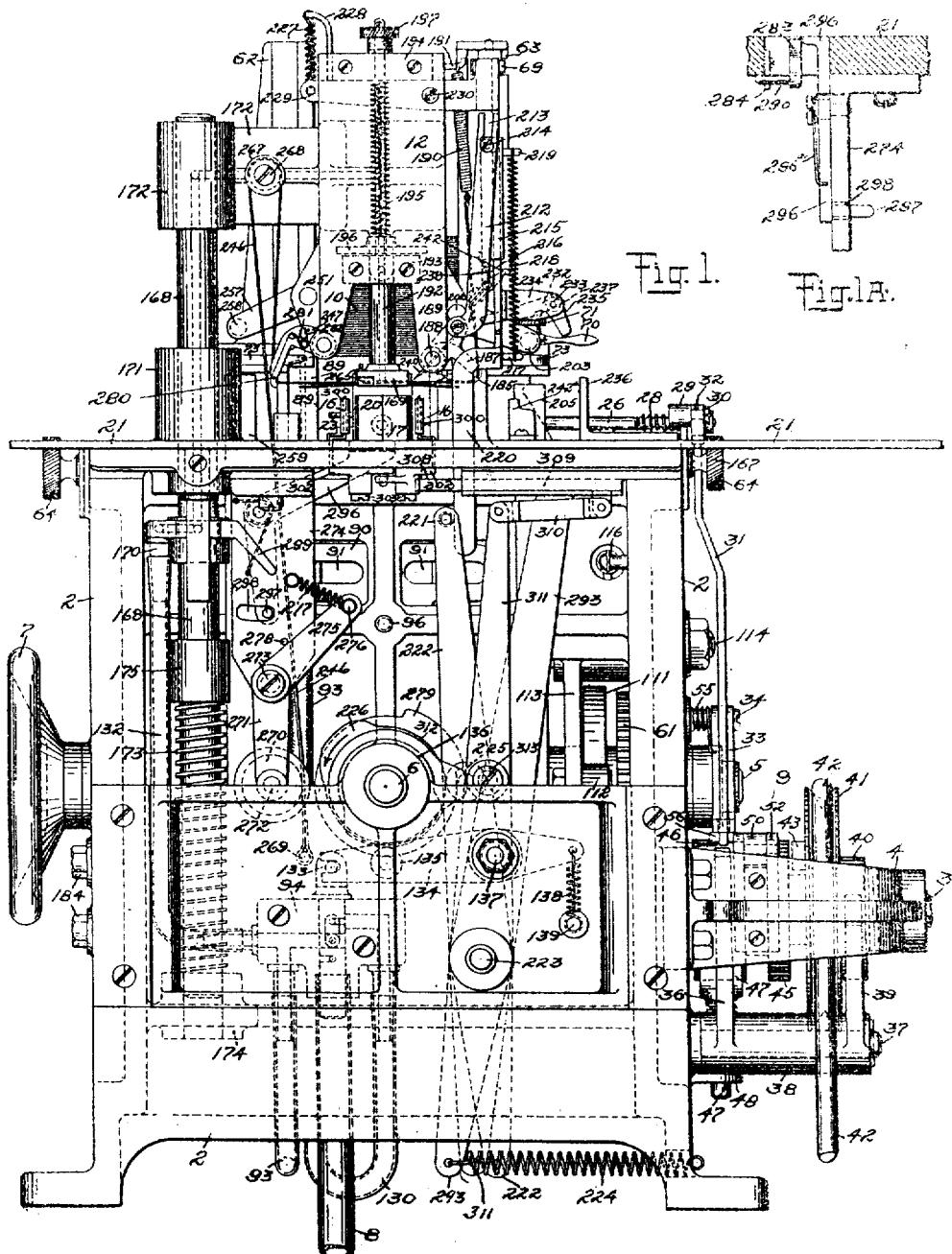

Figs. 15 to 18 inclusive are detail views showing the band applying parts in different positions. These positions are successively occupied in the operation of banding and ejecting.

Figs. 19 and 20 are detail views, partially in section, and taken at right angles to each other, showing the band perforating mechanism.

Fig. 21 shows the dies in engagement in the position occupied when perforating and bending a band.

Figs. 22 to 27 inclusive show details of this mechanism.

Figs. 28 and 29 show the band after it is perforated and bent and before it is wrapped about an article.

Figs. 30 to 36 inclusive show details of construction relating to the band holding magazine and the mechanism connected therewith for removing the bottom band from the pile, Figs. 31 and 35 being sectional views on the lines 31—31 of Fig. 30 respectively, looking in the direction of the arrows.

Figs. 36 and 37 are front and rear views, respectively, of the mechanism for wrapping a band about a cigar.

Fig. 38 is a detail view showing a tongue for causing one end of a band to enter into proper engagement with the slots at the other end.

Figs. 39, 40 and 41 show the successive operations of the band applying mechanism.

Figs. 42, 43 and 44 show portions of this mechanism, immediately adjacent to the band, drawn twice to the scale actually used.

Fig. 45 shows the article centering mechanism which causes the article to enter the apparatus true so that it will be banded correctly.

Fig. 46 shows a tape securing part of the machine.

Fig. 47 is an inverted plan view showing the tapes holding and securing the engagements of the ends of the bands.

Figs. 48 and 49 show a cigar with a band thereon, these figures differing in that Fig.

49 shows the complete product while Fig. 48 shows the band in the position occupied before being folded back at its end.

Throughout the various views of the drawings, similar reference characters designate similar parts.

My improved machine 1 contains a frame 2 of any suitable shape but preferably substantially as shown, and in this frame 2 are mounted the various elements of the machine including the clutch shaft 3 which is also mounted in a suitable bracket 4 at its outer end, and this bracket is secured to the frame 2, and the main shaft 5 and a cam shaft 6 which runs at right angles to the main shaft, as well as other parts. All these shafts are suitably mounted and driven by mechanisms which will be described below. Or, if desired, the machine may be driven from a hand wheel 7 secured to one end of the main shaft 5. The machine also derives power from a suitable suction pipe 8 which is connected to any suitable exhaust apparatus, not shown.

The power which the machine derives from both of these sources is used to drive the machine for a predetermined period through the clutch mechanism 9, and while so driven, the machine applies one band 10 about a cigar or other article 11 by means of the band applying mechanism designated generically by the character 12, perforates another band by the perforating mechanism designated generically by the character 13 and conveys this band by means of a conveyer designated by the character 14 from a suitable magazine 15 which has mechanism for removing the lowest band at one time. There is also a centering mechanism 16 and a clutch control device 17. These various mechanisms and their operation, both generally and severally, will now be described, beginning with the clutch control mechanism 17 and the clutch mechanism 9.

*The clutch control mechanism and the clutch.*

Figure 18:
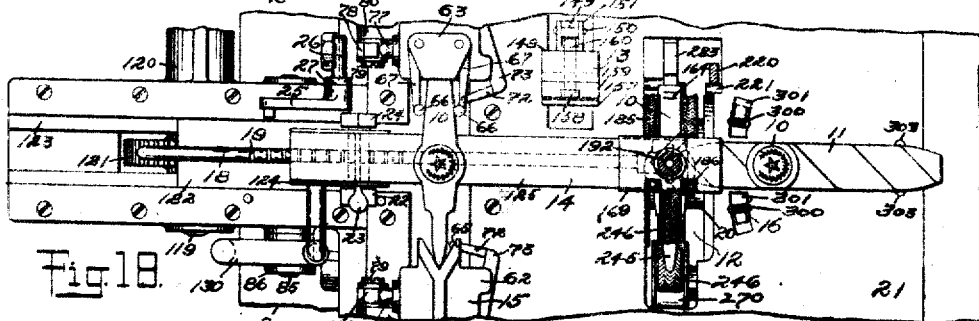

The clutch control mechanism 17 is provided with a suitable notched bar 18 provided with suitable notches 19 for the purposes of adjustment, as will appear below, and at its forward end the bar 18 is provided with a suitable crotch 20 which is adapted to receive the end of a cigar or other article which is to be banded. At a later time this crotch 20 acts as an ejector, as shown in Fig. 18. The rear end of the bar 18 slides freely in a suitable perforation in the band conveying mechanism 14, and the front end rests on the table 21 of the machine. A suitable cam slide 22 is mounted on the rod 18 and secured in position by means of a suitable spring pressed lever 23 adapted to enter a slot 19 and hold the slide 22 and the rod 18 in fixed relation, although the connection is an adjustable one so that the machine may band articles of different lengths. The side 22 also has a cam face 24 which is adapted to engage a suitable crank arm 25 fixed on a shaft 26 which is mounted in suitable bearings 27 in which it can turn against the tension of a coil spring 28 which is mounted for this purpose on the shaft 26 and connected therewith and with a bearing 27. This shaft 26 also carries a second crank 29 which has a crank-pin 30 which engages the vertically disposed rod 31 and raises or lowers this rod 31 through a suitable loose pivot 32.

The lower end of the rod 31 passes through a suitable perforation in the pivoted guide 33 which is pivoted at 34 to the frame 2 of the machine. Normally, the rod 31 is held so that its lower end is elevated above the level of the lower edge of the guide 33, by which it is lowered, through the mechanism above described. This lower end engages a projection 35 on a rocker arm 36, pivoted on a suitable shaft 37 which is fixed to the frame 2 of the machine. This arm 36 is made integral with a suitable bushing 38, which also carries a second arm 39 which engages an eccentric 40 which revolves on the clutch shaft 3 of the machine, and is fixed to the pulley 41, which receives power for driving the machine from a suitable belt 42, which is always running when the machine is in use, so that the pulley 41 and the eccentric 40 constantly revolve.

The pulley 41 has a projection 43 on the face opposite the one to which the eccentric 40 is secured and this projection 43 is adapted to engage the spring bolt 44 in the groove drum 45 of the clutch. This groove drum 45 is fixed to the shaft 3, and has a surface 46, adapted to engage a spring pressed brake 47 which is mounted in a suitable bracket 48 secured to the frame 2 of the machine.

The arm 39 is kept in engagement with the eccentric 40 by means of a suitable coil spring 49 which rests against this arm 39 and also against the bracket 4 in which the outer end of the stud shaft 3 is journaled.

It is not necessary to describe the clutch member 9 in great detail, because it is an ordinary dog clutch. In the grooved drum 45 there is a suitable pawl 50 pivoted at 51 to a bracket 52, which is secured to the bracket 4. A small projection 53 is provided with a coil spring 54 which tends to raise this pawl 50. When the pawl 50 is depressed, it may be held in its lowest position with its free end in the groove of the drum 45 where it holds back the spring bolt 44, so that the projection 43 will not engage it. It is held in this lowermost position by means of the swinging guide 33 which is normally spring pressed by a suitable spring 55 so as to cause it to perform this function. The swinging guide is not over all of the pawl 50, but may be over a projection 56, which extends laterally from the same.

Figure 2:
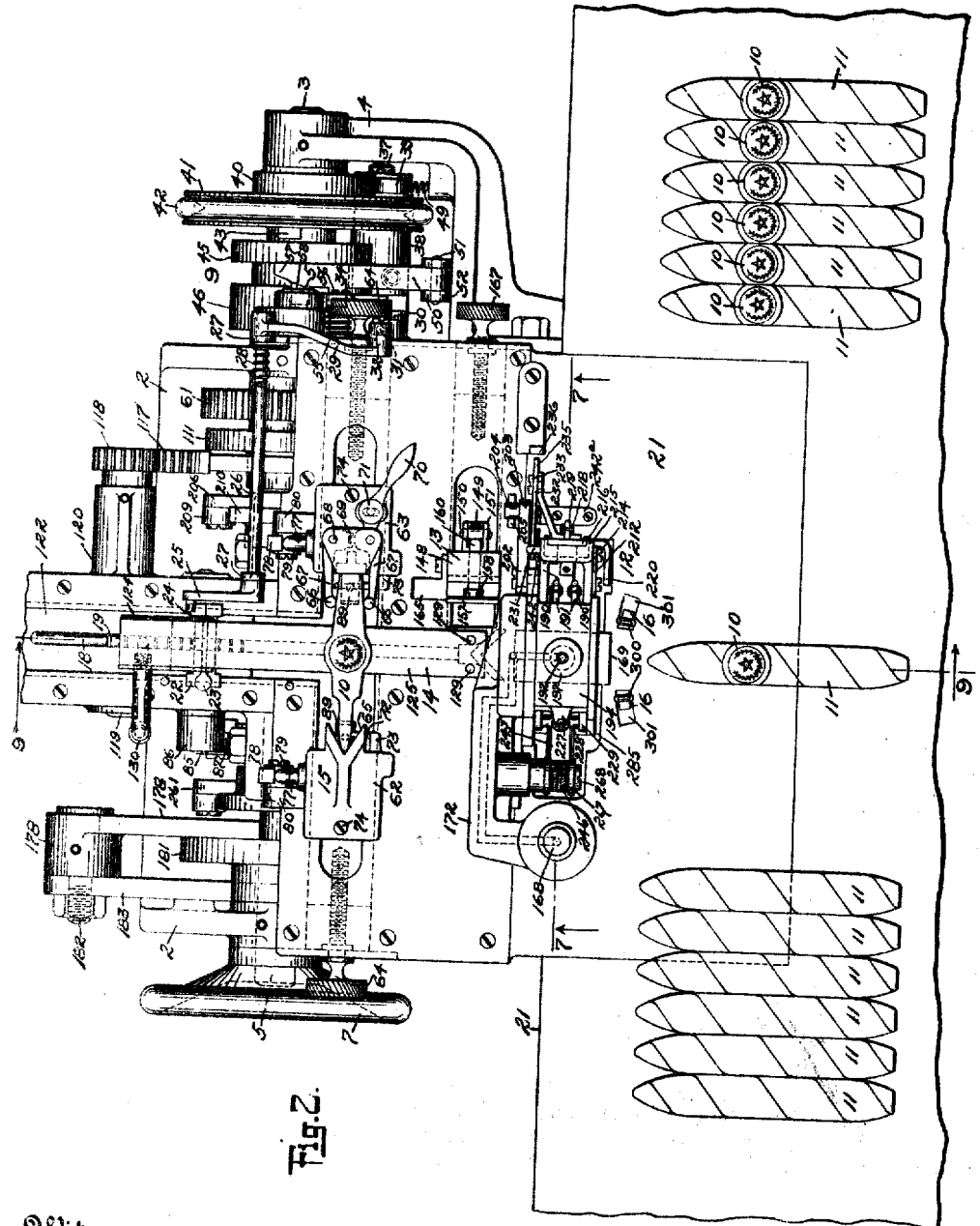
Fig. 2 is a plan view of the machine.
Figure 6:
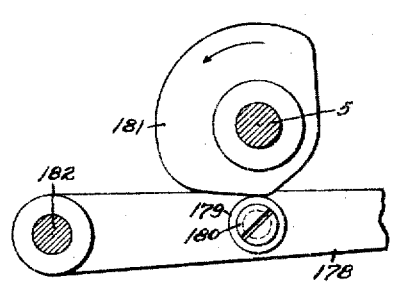
Fig. 6 is a detail view showing a cam and connected parts for elevating and lowering the banding mechanism.

The beveling of the front edge at 57 so as to cause it to engage the spring pressed bolt 44 is shown in Figs. 2 and 3. There is also shown a laterally extending projection 58 parallel to the projection 56, which is adapted to engage a dog 59 fixed to the main shaft 5. The clutch shaft 3 carries a pinion 60 which meshes with a gear 61, carrying three times as many teeth, so that the clutch shaft 3 makes three revolutions for each revolution of the main shaft 5.

Figures 11, 12:
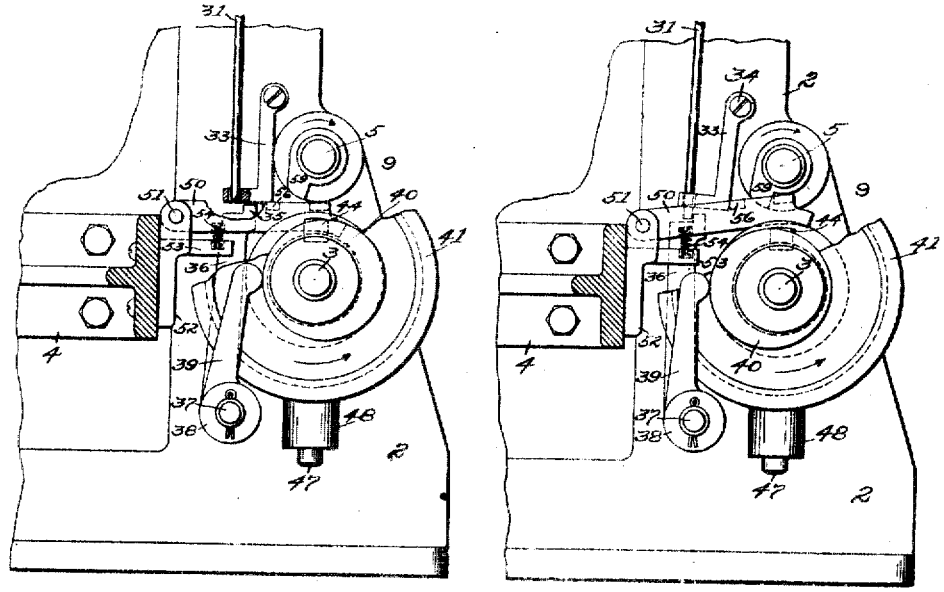
Figs. 11 and 12 are detail views showing the clutch actuating mechanism in different positions.

The clutch causes the shaft 3 to drive the shaft 5 through these gears 60 and 61 when the rod 31 is lowered, so as to engage the rocking arm 56, as above described, and this pulls the guide 33 off the projection 56, and against the tension of the spring 55, so that the pawl 50 can fly upwardly under the tension of the spring 54 and thereby permitting the bolt 44 to engage the projection 43 which causes the shaft 5 to revolve, as it is driven by the pulley 41. The revolving of the shaft 3 drives the gears 60 and 61 and rotates the shaft 5 until the rod 31 is raised, and the projection 59 forces the pawl 50 into the groove of the drum 45, and thereby withdraws the bolt 44 from the projection 43. This gives the guide 33 time to get over this projection 56 and the momentum of the shaft 5 and the moving parts connected therewith will carry the projection 59 just clear of the projection 58, as indicated in Fig. 11, so that the next time the rod 31 is lowered, the pawl 50 may take the position shown in Fig. 12, and the cycle may be repeated indefinitely.

While one form of clutch is described, it is obvious that any suitable form may be used. It is required that the clutch be prompt and efficient in its action and the form described by me fulfils these requirements.

*The band holding mechanism.*

The band holding mechanism 15 is mounted on the table 21 and comprises two stands 62 and 63, each of which is adjustable through a suitable adjusting screw 64, so that either may be moved to or from the conveyer 14. The upright 62 has a vertically disposed V-groove 65 adapted to receive the pointed ends or tongues of the labels 10 and the guide 63 carries suitable uprights 66 which preferably take the form of rods mounted at the free ends of crank arms 67, which are fixed to the vertically disposed shafts 68. These crank arms are provided with interengaging gear teeth 69 and one of them is connected to a lever 70 fulcrumed on a vertical shaft 68 and provided with a detent 71 so that the rod 66 may be placed and held in any desired position, according to the width of the bands 10 which are placed in the machine.

The pile of bands 10 is normally supported by means of the fingers 72 which extend from the bell crank levers 73, which are fulcrumed at 74 in the uprights 62 and 63. In Fig. 35 the finger 72 and its connected parts are shown as they appear at the upright 63. It will be understood that a corresponding structure is found in the upright 62. This bell crank lever 73 is provided with an extension 75 which engages a coil spring 76 let into a suitable recess in the base of the upright. A bolt 77 runs through a suitable opening in this upright and this bolt is engaged by a bell crank lever 78 fulcrumed at 79 on a bracket 80 extending laterally from the upright. The other end of this bell crank lever 78 enters a perforation in a slide 81 which is adapted to be depressed by means of a suitable crank pin 82 mounted in a cam-controlled lever 83 and engaging a projection 84 on the slide 81. The arm 83 is mounted on the bar 85 and fixed thereon, and this bar also carries a second lever 86 which is provided with a suitable cam roller 87 which engages a cam 88 on the main shaft 5 of the machine so as to give the projection 84 its proper movement. It is to be understood that there are two such slides 81, projections 84 and one lever 83 with a bar 82 to operate both slides 81.

The pile of bands 10 is not always supported by the fingers 72 but sometimes by the tubular slides 89 which are hollow and beveled on their upper surfaces, as shown, so as to draw down the ends of the lowest band, when suction is applied, and thereby permit the fingers 72 to intervene between the ends of the lowest band and the bands above while the bands are supported by the slides 89. To facilitate this operation the slides 89 are mounted so as to rise and fall as they are carried by means of a suitable slide 90 on which they are mounted by means of slots 91 and stud pipes 92 which pass through said slots and connect, in each instance, at one end with an opening in an upright 89, and at the other end with the tubes 93 which run to the exhaust pipe 8 through a suitable valve 94, which will be described below, and is shown in detail in Figs. 13 and 14. It will be understood that there are two tubes 93 which merge through a suitable connection so that only one tube 93 reaches the valve 94.

The slide 90 is provided with suitable slots 95 in which are screws 96 which permit this slide to have a slight vertical movement which is imparted by means of a cam roller 97 which rides on a suitable cam 98 on the cam shaft 6 of the machine. The roller 97 is mounted on a suitable stud 99 and kept in contact with the cam 98 by means of a suitable coil spring 100 which has its lower end resting on a bracket 101 extending laterally from the slide 90, and its upper end resting in a suitable socket 102 integral with a suitable guiding bracket 103 which is secured to the frame 2 of the machine by means of screws 104, or in any other suitable manner. The slide 90 is slotted so as to permit the shaft 6 to pass through it.

The uprights 62 and 63 have their lower ends mounted on a suitable cross-bar 105 which is properly supported from the frame of the machine, as shown in Fig. 9, and held in place by suitable screws 106.

The shaft 6 is driven from the shaft 5 by means of bevel gears 107 and 108, with the same number of teeth which are fixed to these respective shafts.

In view of the foregoing, the operation of the label holding mechanism will be readily understood. Assuming that the pile of labels is in place and the bars 66 are correspondingly adjusted and the lowermost label rests on the fingers 72 the uprights 89 are raised by the cam 98, and at the same time the cam 88 becomes active so as to shift the fingers 72 through the levers 83 and slides 81 and bell crank levers 78 and bolts 77, and then as soon as the fingers are withdrawn the suction will draw down the ends of the lowest label or band and immediately thereafter the fingers 72 are returned to their normal position which places them between the ends of the lowermost band and the second band, and then the uprights 89 are lowered to the level of the conveyer 14 so that the middle of the band is held by suction to the upper surface of the conveyer 14 and then the suction in the arms 89 is discontinued and the label is thereafter carried forward by the conveyer, which will now be described.

The conveyer.

The conveyer 14 is driven by a cam 111 fixed on the main shaft 5, and this cam engages a cam roller 112 mounted on a lever 113 (see Fig. 1 and Fig. 3) which is pivoted on a stud 114 fixed in the frame 2 and the boss from which the arm 113 extends also carries another arm 115 which is connected to a coil spring 116, which is also connected to the frame 2, and this boss also carries a segmental gear 117 which meshes with a pinion 118 fixedly mounted on a shaft 119 which is supported in brackets 120 extending from the frame of the machine, which brackets also carry the shaft 85, as shown in Fig. 9. The shaft 119 carries a segmental gear 121 which meshes with a rack 122 mounted to slide in suitable grooves 123 in the brackets 120, and this slide carries thereon an upright 124 which is perforated to receive the rod 18 and provided with a laterally extending flat and tubular projection 125 which forms the part of the conveyer which carries the bands or labels. The upright 124 is perforated to connect with the opening in the projection 125, as will appear below. The upright 124 also carries a pivoted dog 126 kept in place by a spring 127 secured on the underside of the projection 125 so that the dog 126 limits the forward movement of the rod 18 by engaging the slide 22, and the rearward movement of this rod 18 is limited by having the slide 22 come into engagement with the upright 124. The arm 125 also carries a perforated bracket 128 through which the rod 18 passes near its forward end. This bracket 128 serves to steady the rod 18 and hold the same true. Near its forward end the tubular arm 125 carries a suitable pair of perforations 129 which run to the central opening which is connected with the exhaust apparatus so that the conveyer 14 can readily take a band 10 from the uprights 89 as soon as the suction is released and convey the same first to the perforating mechanism 13 where a stop is made while the perforations are inserted, and then to the band applying mechanism 12 where the band is raised by means of a suction aperture to be described below, and then the conveyer returns so as to have its perforations in line with the band perforator 13 and later, upon the next starting of the machine, it retreats to the band holders 15 so as to receive another band 10, and thus repeat the cycle indefinitely. It will be understood that the cam 111 is so timed and shaped that the operations will take place in the proper order.

To secure the proper suction the opening in the upright 124 is connected to a suitable tube 130 which runs to the valve 94.

Exhaust control mechanism.

Figures 13, 14:
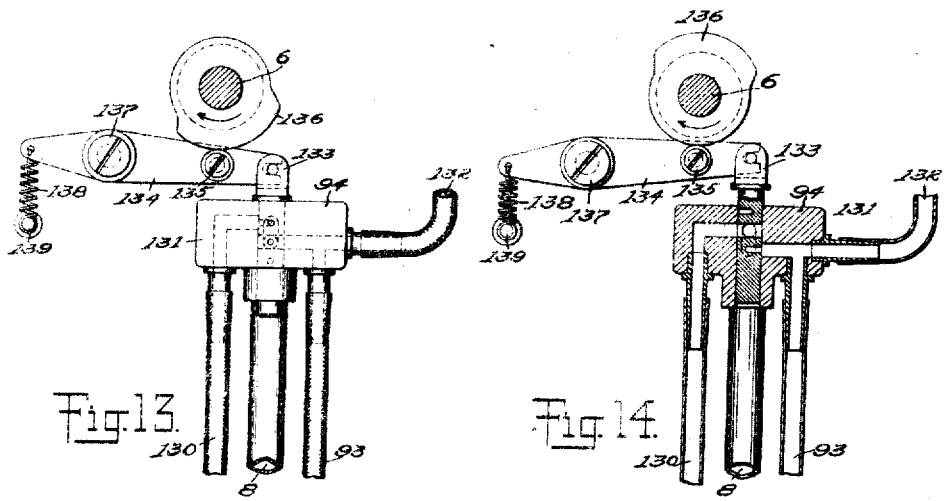
Figs. 13 and 14 are detail views showing a valve of the pneumatic mechanism for governing the suction of the apparatus.

As above described, the exhaust control mechanism has a valve 94 to which run the tubes 93, 130 and 8. It will be understood that these tubes always work by exhaustion so as to draw the bands to the respective openings, and the valve mechanism will be described by which this is accomplished. It is also to be noted that running into the casing 131 of the valve 94 is a tube 132 which is connected to the band applying mechanism which will be described below. The casing 131 has a plunger 133 provided with suitable ports, as shown, so that the exhaust 8 may be connected with either the tubes 93 and 132 or with the tube 130, but never with the tubes 130 and 93 at the same time. The plunger 133 is connected to a suitable cam lever 134 provided with a cam roller 135, in the conventional manner, and this roller engages a cam 136 mounted on the cam shaft 6 as shown in Figs. 13 and 14, and this lever 134 is fulcrumed at 137. This fulcrum is secured in any suitable way to the frame 2 of the machine. The free end of this lever 134 is connected to a coil spring 138 which runs to a pin 139 which extends from the frame 2 of the machine. The object of this coil spring 138 is to keep the roller 135 in contact with the cam 136 so as to give the plunger 133 the movements it requires to perform its functions.

*The perforating mechanism.*

The perforating mechanism 13 has to act promptly so as to keep in step with the apparatus and not only perforate the labels properly but also disengage them promptly after perforating them, and furthermore, this perforating mechanism in the embodiment of my invention herein shown, has to give a peculiar shape to the part of the band which is adjacent to the perforations. All this is accomplished by this mechanism 13, which will now be described.

The band perforating mechanism is best shown in Fig. 19 to Fig. 27 inclusive, and in Figs. 7 and 8. The description will begin with Fig. 8. Here it appears with a pivot 140, which is mounted as shown at Fig. 7, on the frame 2 of the machine, and on this pivot is placed a suitable bent lever 141 which extends around and under the cam shaft 6 and is provided with a suitable cam roller 142 which is adapted to engage a cam 143 on this shaft. The free end of this lever 141 is pivotally connected to a link 144 which runs upwardly (see Figs. 19 and 20) to a suitable slide 145 to which it is pivotally connected. The slide 145 is provided with a laterally extending projection 146 which passes through a slot 147 in a guide 148 to engage a suitable lever 149 pivoted at 150 in ears 151 which extend laterally from the guide 148. The projection 146 rests on a suitable coil spring 152 which rests on the bottom of the guide 148. The function of this spring 152 is to elevate the slide 145 and thereby hold the cam roller 142 against this cam 143. It will be understood that normally this roller 142 depresses the slide 145 and once in each revolution this roller enters a recess in the face of the cam 143 and elevates the slide 145. At its upper end the slide 145 takes into a suitable recess 153 in the guide 148 and in this recess the slide 145 has its upper end provided with a die composed of a projection 154 sandwiched in between two parts which are recessed, as shown at 155. The slide 145 has laterally extending edges 156 which take in corresponding grooves in the casing 148 so as to cause this slide 145 to move in a vertical direction only. The upper end of the slide 145 forms a die with both male and female parts, as above described. This casing 148 also carries an upper die with male and female parts 157, 158 and 159, the lower edges of which cooperate with the dies 155 and 154, as shown. The dies 157 and 159 have no vertical movement but the die 157 does have a lateral movement from the lever 149 which has an upper end engaging a suitable pin or plunger 160 which is mounted in a suitable recess in the casing 148 and secured to the center of the die 157. This plunger 160 carries a suitable collar 161 and coil spring 162 which acts in opposition to the lever 149. The die 157 is kept from rotation by means of suitable dowel pins 163 on which it slides.

The die 159 is recessed as shown in Fig. 22 to receive the female die 158, shown in Fig. 26, and this die 158 is suitably perforated so as to permit the plunger 161 to pass therethrough. When the slide 145 is lowered the projection 146 engages the lever 149 and overpowers the spring 162 and separates the die 157 from the dies 158 and 159. When the die 145 is raised the shape of the free end of the projection 146 is such that the lever 149 is allowed to approach the die 145 at its lower end under the tension of the spring 162 and thereby draw the part 157 to the other elements of the die. As soon as the slide 145 is lowered the part 157 is forced away from the dies 158 and 159 by the action of the lever 149 and against the tension of the spring 162. This separation is necessary to permit the band 10 to be quickly released. The dies shape the end of the band 10, as shown at 164 in Figs. 28 and 29, and if this separation did not take place, the action of the dies would be impeded and would be made slower and at times the band would be shifted on the conveyer 14. A suitable guide 165 causes the free end of the approaching band, which is to be perforated, to enter the perforating apparatus 13 true and right in all respects so that the perforations will be properly formed.

As all bands are not the same length, provision must be made for adjusting the perforating mechanism so that it may correspond with any length of band which may be used in the machine, and to facilitate this the casing 148 is provided with a laterally extending cross-head 166 which moves in suitable slideways in the frame 2 of the machine under the influence of a suitable screw 167 mounted in the conventional manner.

In view of the foregoing, the action of the perforator 13 will be readily understood. The band is brought by the conveyer 14 with its end under the guide 165 and the conveyer stops with the band true and in position, the cam 111 being so shaped and timed as to bring this about. When in position, the cam 143 permits the raising of the slide 145 by the spring 152 and simultaneously the die 157 is brought against the dies 158 and 159 so that at the moment of severing the parts all properly coöperate. As soon as the slide 145 retreats the die 157 is separated, as above described, and all parts of the band 10 are separated from the dies so that the movement of the band to the band applying mechanism 12 is in no way interfered with.

*The band applying mechanism.*

The conveyer 14 takes the perforated band from the perforating mechanism to the band applying mechanism 12. The band is first transferred to the platen 169 before it descends, through the suction of the tube 132. This tube 132 runs to the vertically disposed nozzle 170 which is connected to the opening in the spindle 168, as shown.

Figure 5:
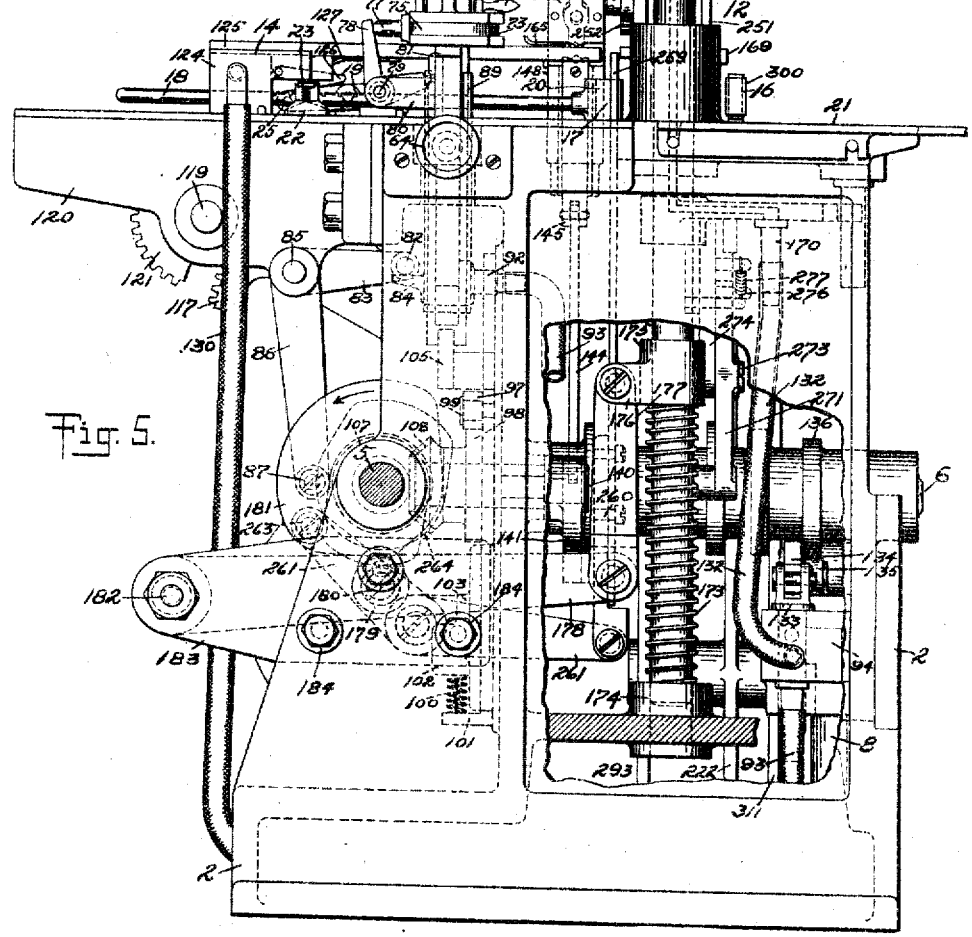
Fig. 5 is a side elevation, partially in section, taken at the left of Fig. 1.

The platen 169 of the band applying mechanism 12, is connected, through a suitable stem and bracket 172, with the bar 168, and this bar is slidably mounted in guides 171 and 174 and normally kept in its most elevated position by a suitable coil spring 173, which encircles its lower end and rests on the guide 174 projecting from the frame 2 (see Fig. 5) and at its upper end engages a collar 175 with projecting ears 176 between which is pivotally connected, in the usual manner, a suitable link 177, and this link is pivotally connected, in the conventional way, to a cam lever 178, which has a suitable cam roller 179 mounted on the usual pin 180, and this roller 179 engages a cam 181, fixedly mounted on the shaft 5. The extreme end of the cam lever 178 is pivotally mounted on a pivot 182, which is secured at the rear end of a bracket 183, which is secured to the frame 2 by bolts 184 or any other suitable means. It will be noted that the shape of the cam 181 is such that the roller 179 is lowest through about 130 degrees and elevated all the way for about 60 degrees so as to let the conveyer 14 get under the platen 169, and this roller 179 is then lowered a little for about 60 degrees to facilitate the movement of the band applying mechanism, and during the remaining 110 degrees the roller 179 is passing from one position to another. It will be understood that the bar 168 is raised and lowered in accordance with the shape of this cam 181.

The mechanism will now be described in detail which comes in contact with the band and wraps it about the cigar or other article, 11 which is banded in this machine.

As soon as the conveyer 14 is withdrawn and the band 10 adheres to the platen 169, as above described, through suction, the bar 168 is lowered so that this platen rests just above the article which is to be banded, as shown in Fig. 39. Two parallel bands 185 have one of their free ends, in each instance, secured to a suitable pin 186, on top of the platen 169, and these bands pass underneath this platen 169 and then run over pivoted fingers 187, pivoted at 188, in projecting ears 189 of the bracket 172, and thence these bands 185 run to coil springs 190, which serve to keep them tight under all the conditions of service, and these coil springs have their upper ends secured to pins 191 projecting from the bracket 172.

The platen 169 is not rigidly connected to the bracket 172, but is slidably mounted therein by means of a hollow stem 192, and perforated guides 193, 194, and the stem 192 is provided with a coil spring 195 which surrounds its intermediate and upper portion, and this spring 195 rests against a plate 196 at its lower end and at its upper against the guide 194. The platen 169, bracket 172 and rod 168 have a common passage which runs to the tube 132 so that a band may be held to the platen 169. The upper end of the stem 192 is screw-threaded and provided with a thumb nut 197, by means of which the platen 169 may be raised or lowered. The fingers 187 are fixedly mounted on their shaft 188, and this shaft is recessed between the fingers. It carries on its inner end a suitable pinion 198, (see Fig. 37) and this pinion meshes with a segmental gear 199, which is normally held by a coil spring 200, as shown, against a stop 201, but which may be thrown on its pivot 202, which is carried by the inner bearing 189 by means of a crank 203 which carries a crank pin 204 which is adapted to engage a vertical rod 205, which is pivotally connected at its lower end, (see Fig. 9) to a lever 206 fulcrumed at 207 in a bracket 208, carried by the frame 2 of the machine. The lever 206 is a bell crank lever and carries at its free end a cam roller 209, in the usual manner, which engages a corresponding cam 210, fixed on the shaft 5. This cam is so timed and shaped that it will raise the rod 205 at the proper time so that it will coöperate with the crank pin 204 to shift the fingers 187 at the proper moment, as will appear below.

One of the fingers 187 has an extending ear 211 which is pivotally connected to a link 212 (see Fig. 36) the upper end of which is slotted at 213 to receive a suitable screw or other projection 214, from a slide 215, which runs on a vertically disposed bar 216. A stop pin 216ᵃ limits the lower movement of this slide 215, as shown. This bar 216 has a projection 217 on which is one end of a coil spring 218, and the upper end of this coil spring 218 engages a corresponding projection 219 on the slide 215, so that the pin 214 is normally held at the bottom of the slot 213.

The lower end of the arm 216 is bent first horizontally, and then vertically, to form a projection 220, which passes through a slot in the table 21 and rests against a pin 221 near its lower end, and this pin is fixed in a cam lever 222, (see Figs. 1 and 9) which is fulcrumed on a suitable pin 223, fixed in the frame 2 of the machine.

The lower end of this lever is provided with a suitable coil spring 224, connected in the conventional way, both to this lever, and to the frame 2 of the machine, so that a cam roller 225, shown in dotted lines in Fig. 1, engages a suitable cam 226 mounted on the cam shaft 6. This cam 226 is so shaped and timed that the lever 222 will swing the extension 220 to the right when required. The extension 220 is kept in contact with the pin 221 by means of a coil spring 227, carried at the top of the bracket 172 by means of a support 228. This spring 227 also engages a lever 229 which is composed of two parallel bars so as to avoid the spindle 192 and each of these bars is pivoted on a suitable pivot 230 which is carried by the bracket 172. These bars 229 are united at their ends by the rod 216, as shown, see Fig. 4.

The slide 215 carries a projection 231, near its lower end and on the side opposite the one on which the projection 214 appears. This projection 231 is adapted to engage a bell crank lever 232 which is pivoted at 233 on a suitable ear 234 carried through the rod 216. The bell crank lever 232 is provided with a long arm which may be raised to engage the pin 231, and a shorter arm 235, which is adapted to engage a fixed cam 236, which is secured to the table 21 of the machine. A pin 237 under the long arm of the lever 232 supports this arm, as shown in Fig. 38, when it is not in use.

The lower end of the slide 215 is provided with downwardly extending ears 238 which are placed at substantially the center of the lower edge and carry a pivot pin 239 on which is pivotally mounted the spring finger 240. This spring finger carries a leaf spring 241 which also presses the slide 215 at its lower edge and between the ears 238, and in addition to this spring carries a suitable tang 242 which is extended laterally until clear of the ears 238, and thence upwardly, and thence at right angles. When moved downwardly it is shifted until its end rests on the stop 242ª, as shown in Fig. 40.

The width of the tongue 240 is such that it can enter the openings made by the perforating mechanism 13 in the band, and it is made, as shown in Fig. 38, with a pointed lower end, a downwardly disposed swelling 243 and laterally extending ears 244 which form stops to properly position the tongue 240 in the band 10, as shown in Fig. 39.

The function of the swelling 243 and the ears 244 are well shown in Fig. 42 where the swelling 243 is shown opening the perforated part of the band 10 to receive the tongue 245 which is about to be put in place by mechanism which will be described below.

The mechanism for placing the end 245 consists of a band 246 and the parts connected therewith. This band 246 runs over a single finger 247 made substantially as shown, that is with a slot 248 at its free end where the band 246 passes, and on its lower surface is provided a guide groove 249 for this band, and this finger is bent as shown, and pivotally supported on a spindle 250 which is fixed to the finger and turns freely in ears 251 which extend from the bracket 172. The pivot 250, like the pivot 188, carries a suitable pinion 252 which meshes with a segmental gear 253 in all respects similar to the corresponding gear 199, and mounted in the same way on a pivot 254 secured to an ear 251 and held against a stop pin 255 by means of a suitable coil spring 256 which is connected to the bracket 172, the same as the corresponding spring 200. This segmental gear 253 is provided with a laterally extending arm 257 on which is a crank pin 258 which is adapted to engage the top of a bar 259 which corresponds to the bar 205, and has the same movement, as it is provided with suitable guides 260 corresponding to similar guides 260 on the rod 205 so that this rod, like the rod 205, has a vertical movement only which it receives from a suitable cam lever 261 to which it is pivotally connected, and mounted on a corresponding bracket 262 and provided with a cam roller 263 which engages a cam 264 corresponding to the cam 210 and fixed to the main shaft 5. The movement of the rod 259 is such that the finger 247 is thrown on its pivot at the right time so as to correspond with the corresponding throw of the fingers 187 against the tension of the spring 256.

The tape 246 is secured at one end to the platen 169 by being passed under a suitable bar 265 secured thereto by suitable screws 266, shown in Fig. 46, or in any other suitable way, and thence passes over the finger 247, but not to a spring corresponding to the spring 190, but over a pulley 267 mounted on a pivot 268 on the bracket 172 and thence downwardly to a weight 269 which hangs free on the end of this tape 246.

Just above this weight 269 is mounted a movable pulley 270 (see Fig. 1) which is hung on an arm 271 and supported by a suitable pivot 272 which arm 271 is pivoted at 273 to a suitable bracket 274 hung from the lower surface of the table 21 of the machine. This arm 271 extends diagonally upward, as shown at 275, and is provided with a connecting pin 276 to which is secured a coil spring 277 which is also secured to the bracket 274, so that under normal conditions the arm 271 is held close to a suitable stop pin 278, so that the band 246 which is held against the roller 270 can give away against the tension of the spring 277 when sufficient pressure is brought to bear on the belt and opposite the roller. This pressure occurs every revolution of the shaft 6 when a cam 279 presses against this tape 246, and thereby draws it in the direction of its length, for a purpose which will appear below.

One wall of the slot 248 is formed by the yoke 280 which is placed on the finger 247 and extends parallel therewith and has its free ends pivotally mounted on a pin 281. A coil spring 282 keeps the yoke 280 and the finger 247 in their normal relationship and permits the end of the yoke 280 to give at the right time so as not to interfere with the operation of the tongue 245 when engaging the tongue 240 and its swelling 245 and ears 244.

The mechanism above described, as will appear below, provides for inserting the tongue 245 through the openings 164 in the band 10. The mechanism for bending back the tongue 245 will now be described. This mechanism is about to act when the parts are in the position shown in Fig. 41, that is, immediately after the tongue 240 has been partially withdrawn and when the band 10 is in place, except for the folding back of the tongue 245. A folder 283 has its pointed end close to the tongue 240, and immediately after this tongue 240 has been withdrawn the folder 283 shifts transversely and rubs against the tongue 245 with a down and up motion to the position shown in Fig. 44, so that the tongue 245 is folded from the position shown in Fig. 48 to that shown in Fig. 49. This transverse, down and up motion of the folder 283 is produced by several elements which will now be described. The down and up movement is produced by a suitable cam 284 which is fixed in a slot 285 of the table 21 immediately below where the band is applied and is adjustably mounted on suitable screws 286, as shown. The cam 284 has a downwardly extending surface 287 and upwardly extending surface 288, as shown in Fig. 43, and the folder 283 has a projection 289 which carries a pin 290 which is adapted to ride over the cam 284 and this causes the folder 283 first to have a downward movement when the pin 290 is in contact with the surface 287, and an upward movement when the pin is in contact with the surface 288. During the greater part of the movement of the folder 283 the pin 290 rides against the under surface of the table 21, and at such a time gives neither an up nor a down movement to the folder. A leaf spring 292 has its free end pressing against the lower surface of the folder 283 and its other end secured to a vertical lever 293 which is pivoted on a pin 223 the same as the lever 222, and is provided with a coil spring 224 the same as the corresponding spring 224 for the lever 222, and the movement of this lever 293 is governed by a suitable cam 294 fixed to the shaft 6 which engages a suitable cam roller 295, see Fig. 7, and produces thereby the desired oscillation of the lever 293. The upper end of the lever 293 is pivotally connected to the folder 283, as shown. The cam 294 is so arranged and timed that once each revolution of the shaft 6 the folder 283 has the transverse and down and up movement above described.

After the folding of the end 245 is completed, as shown in Fig. 44, provision must be made for lifting the cigar and band so that the end 245 will not be caught in the slot 285 when the cigar is ejected from the machine. To accomplish this result, reference is to be had to the structure shown in Fig. 4 where is disclosed a bell crank lever 296 with its upper edge placed flush with the upper surface of the table 21, or very slightly above the same, and its lower end provided with a pin 297 which passes through a slot 298 in the bracket 274 so that it may engage a cam 299 which is fixed to the vertical spindle 168 so that when the spindle descends, the cam 299 will wipe the pin 297 and force this pin to the left and thereby draw the upper end of the lever 296 away from the opening 285 and clear of the folder 283, and when the spindle 168 is raised, a spring 296ª will again raise the upper end of the lever 296 flush with the table surface.

In view of the foregoing, the operation of the band applying part of my machine will be readily understood. Assuming that a cigar 11, or other article to be banded, is in place, and a label is held to the platen 169 by suction, and under the tapes 185 and 246, the first operation is the lowering of the platen until the band is on the cigar. Then the fingers 187 are actuated so as to throw the slotted end of the band 10 to the position where it extends downwardly at an angle of substantially 45 degrees. Then the tongue 240 is thrust forward because the lowering of the bracket 172, the raising of the bar 205, etc., cause a corresponding lowering of the fingers 187 and the shifting of these fingers 187 causes a lowering of the link 212, and this permits the slide 215 to be lowered under the tension of the spring 218, which lowering causes this tongue 240 to enter the slotted end 164 of the band 10 until the laterally extending ears 244 of this tongue 240 rest against this band while the band passes through one of the perforations, the second from the end, and the swelling 243 rests against the part of the band 10 which is between the two slots, thereby causing it to swell. A further movement of these parts, as well as a shifting of the lever 222, causes a further lowering of the link 212, and then the slide 215 will cause a lowering until this slide is snug against the stop pin 216ª on the bracket 216. At this time the tongue 240 is horizontally disposed, as shown in Figs. 40 and 42, and it will be noted that the ears 244 and the swelling 243 of this tongue 240 provide a suitable opening for the tongue 245. It will also be noted that while the finger 187 and its connected parts have been acting, as above described, the finger 247 has been actuated so as to throw the end of the tongue 245 of the band 10 over the extreme end of this band which is shifted by the folder 187, but there is a loop just to the left of the cigar 11 which provides some slack so that at the left the band is not in contact with the article. When the parts are in the position shown in Fig. 42, the cam 279 becomes active and presses the tape 246 against the roller 270 and thereby causes this tape to move in the direction of its length and thereby take up the slack at the place above indicated and shift the tongue 245 under the projection 243 and over the part of the band which is between the slots. As soon as the end of the tongue 245 has gotten over this part of the band, the tongue 240 is withdrawn by a reversal of the above stated movements of the slide 215 and bar 216 so as to be near the end of the band 245, as shown in Figs. 41 and 43, and then the folder 283 is thrown forward, as above described, and folds the end 245, as indicated in Fig. 44, and then the banding is complete and the parts of the banding mechanism are drawn free of the cigar or other article which has just been banded, and then the bell crank lever 296 is thrown, as above described, so as to elevate the cigar clear of the upper surface of the table 21 so that when the banded article is ejected by the next forward movement of the conveyer 14, the band 10 will not be caught by the walls of the slot 285 in the table 21.

*The centering device.*

It is obvious that when the mechanism above described is in use, the band will not be placed true on the cigar unless the cigar is held true to the mechanism while it is being banded. To insure the proper banding of the cigar, the centering mechanism 16 is provided. This mechanism consists essentially of the vertically disposed fingers 300 which rise vertically through suitable slots 301 in the table 21, and these fingers 300 are covered with some soft material such as leather, and are connected to the horizontally disposed arms 302 and run to pivots 303 on the bottom of the table 21, and at the front thereof. These arms are provided with a connecting spring 304, as shown in Fig. 45, and they are also connected by laterally extending projections 305 with a pin and slot engagement 306 so that each arm will have the same identical annular movement about its pivot 303, and in one direction, against the tension of the spring 304, and in the other direction with the tension of this spring. The result of this structure is that an article to be banded is always held in actual alinement with the bar 18. To provide for the shifting of these arms at the right time, one of them is provided with a slot 307 which is entered by a pin 308 on a slide 309 which is shifted transversely of the machine by means of a pivotally connected link 310 which runs to a cam lever 311 mounted the same as the corresponding levers 293 and 222 on the stud 223, and held so as to be controlled by a cam 312 on the shaft 6 by a suitable coil spring 224, mounted as above described. A suitable cam roller 313, shown in Fig. 1, is mounted on this lever 311 so as to operate or draw together the two uprights 300, as required.

The action of this centering device is so obvious that a description is not necessary.

*Operation.*

Figure 15:
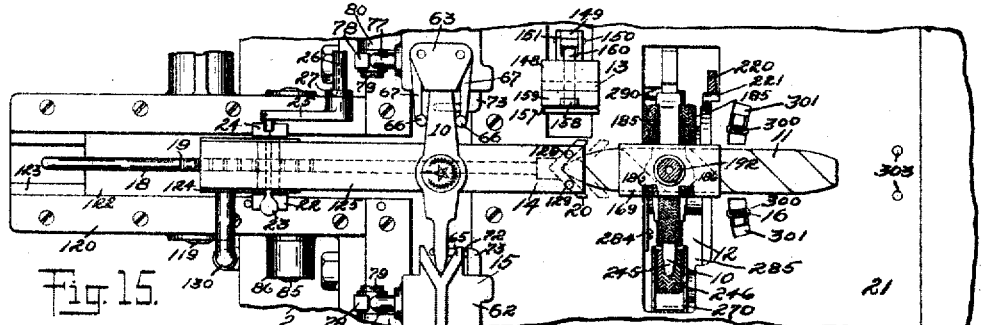
Figure 16:
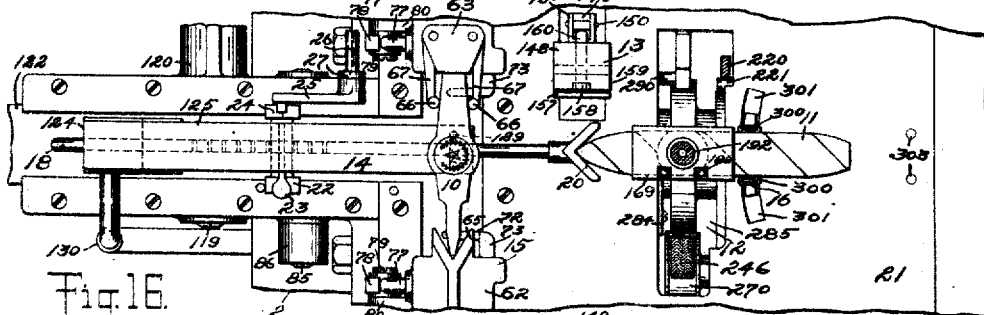
Figure 17:
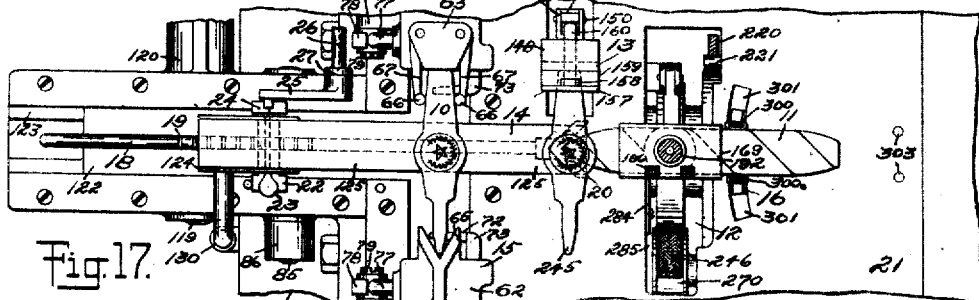

In view of the foregoing, the operation of my improved machine will be readily understood. Assuming that the bands 10 are in place in the magazine and a cigar or other article to be banded has shifted the bar 18 to the rear and thereby caused the machine to start its operation. This operation will be readily understood by referring to Figs. 15 to 18. As soon as the bar 18 has been shifted to the rear and the clutch 9 actuated to start the machine, the conveyer 14 retreats until the perforations 129 are under the lowest band 10 in the band holder 15. There it stops, receives a band, as shown in Fig. 16, then comes forward to the perforating device 13, see Fig. 17, where the band 10 is perforated, and it thereafter advances so that this band is placed under the platen 169 of the banding mechanism 12. If an article 11 has been placed in the machine, in the usual manner, so as to start it, the article is ejected by this forward movement, as shown in Fig. 18. On the assumption that the machine is started for the first time with no band 10 under the platen 169, the article will not be banded, as shown in Fig. 18. Now assuming that this platen 169 has received the band 10, as above described, the conveyer 14 retreats to about its mid-position and there rests. As soon as it is clear of the platen 169, this platen is lowered, as above set forth. When the machine is again started by the insertion of a cigar 11, to be banded, the centering device acts to hold the cigar true so that it may be banded just as it came out of the box, and when restored to the box, all bands will be in proper alinement. As soon as the cigar 11 is clamped by the centering device 16, the banding mechanism 12 applies a band 10, as above described, and while this band is being applied, the conveyer 14, the band holding and delivering device 15 and the perforator 13 act as above set forth, so that a new band is placed under the platen 169, and the banded article is ejected, as shown in Fig. 18, the centering mechanism 16 opening in time to permit this. Having delivered the band and ejected the banded article, the starting device 17 and conveyer 14 retreat with the crotch 20 a little forward of the arm 125, as shown in Fig. 15. When another cigar is inserted, the above cycle of operations is repeated and this is continued as long as the machine 1 is in use.

While I have shown and described one embodiment of my invention, it is obvious that it is not restricted thereto but is broad enough to cover all structures that come within the scope of the annexed claims.

Having thus described my invention, what I claim is:

1. In a machine of the class described, a band magazine, a conveyer for receiving a band therefrom, and carrying said band, means for forming a perforation in a band carried by the conveyer, said perforation made by said perforating means forming one of the elements enabling the band to be secured about an article, and band applying means for receiving the band and causing a portion of said band to engage the perforation formed in the band to hold the same.

2. In a machine of the class described, a band magazine, a conveyer for receiving a band therefrom, and carrying said band, means for perforating a band carried to it by the conveyer and band applying means to cause the imperforate end of the band to engage the perforation made by said perforating means to hold the band in position about an article.

3. In a machine of the class described, a band magazine, a conveyer for receiving a band therefrom and carrying said band, means for perforating one end of the band carried to it by the conveyer, and band applying means for causing the imperforate end of the band to engage the perforation formed by said perforating means to hold the band about an article.

4. In a machine of the class described, a carrier for receiving a band and carrying the same, means for perforating one end of the band carried to it by the carrier while said band is on said carrier, and band applying mechanism for wrapping the band about an article and causing the imperforate end of the band to engage the perforation formed by said perforating means.

5. In a machine of the class described, a band magazine for holding a stack of superposed bands, a conveyer for receiving the lowermost band from said stack and transferring the same to band perforating mechanism where a perforation, forming one of the elements for holding the band about an article, is formed in said band, and band applying mechanism adapted to receive the band after it has been perforated to wrap the same about an article and cause an interengagement of one of its ends with the perforation.

6. In a machine of the class described, a support for an article, a platen to hold an article on its support, a pair of band wrapping fingers, tapes secured to the platen and extending over the fingers, means for pivoting the fingers and means for actuating the tapes to cause the fingers and tapes to wrap a band about an article and means acting in conjunction with said fingers and tapes for causing one end of the band to enter perforations formed in the other end of the band.

7. In a machine of the class described, a support for an article, means for holding a band against said article, fingers and tapes extending over the same, mechanism for actuating one of said fingers to cause one of the tapes to partially fold an imperforate end of the band toward one side of the article, mechanism for actuating the other fingers to cause the tapes actuated by them to wrap a perforated end of the band about the article and mechanism for actuating the first mentioned finger and the tape engaged by it to cause the imperforate end of the band to pass through the perforations in the perforated end.

8. In a machine of the class described for applying a band to a cigar or the like, mechanism for folding a perforated end of said band about the article, mechanism for folding an imperforate end of said band about the article and causing said imperforate end to enter the perforations in the perforated end and means for folding back the imperforate end of the band after it has passed through said perforations.

9. In a machine of the class described, means for applying about an article, a band having an imperforate end and an end having a pair of transverse slits forming a tongue between them, said means comprising mechanism for folding the perforated end about an article, mechanism for folding the imperforate end about the article, mechanism for causing said imperforate end to pass through the transverse slits in the perforated end and mechanism for folding the imperforate end of the band projecting through the slits back upon itself over the tongue formed by the slits.

10. In a machine of the class described, a support for an article, means for holding a band against said article, fingers and tapes extending over the same, mechanism for actuating one of said fingers to cause one of the tapes to partially fold an imperforate end of the band toward one side of the article to be banded, mechanism for actuating the other fingers to cause the tapes actuated by them to wrap the perforated end of the band about the article, mechanism for actuating the first mentioned finger and its tape to cause the imperforate end of the band to pass through the perforations in the perforated end, and mechanism for folding the imperforate end back upon itself after it has been passed through said perforations.

11. In a machine of the class described, means for applying about an article, a band having a pair of parallel transverse slits formed adjacent one of its ends and a tongue formed on its other end to enter said slits, said means comprising mechanism for wrapping the perforated end about the article to be banded, mechanism for wrapping the imperforate end about the article and causing the tongue on said end to be inserted through said slits and mechanism for folding said tongue back upon itself after it has passed through said slits.

12. In a machine of the class described, a band container, a conveyer for receiving a band removed from said container and carrying the same, perforating mechanism to which said band is brought by the conveyer, said perforating mechanism comprising a movable male die adapted to contact with a female die above it, a pair of female dies at each side of and secured to said male die and adapted to coöperate with a pair of male dies connected to the upper female die and band applying mechanism to which the perforated band is brought by the conveyer, said banding mechanism being adapted to cause one end of the band to engage the perforation, formed by the perforating mechanism in the other end, to hold the band about the article.

13. In a machine of the class described, a band container, a conveyer for receiving bands individually as they are removed from said container, and carrying the same, band perforating means, band applying means and mechanism for actuating the conveyer to transport the band to the perforating means where one end of the band is perforated to produce a perforation which forms one of the elements for holding the band about an article, and thence to the band applying means, said band applying means causing the imperforate end of the band to engage the perforation in the other end to hold the band about the article.

14. In a machine of the class described, a band container, a band conveyer, means for removing the bands individually from the container to the conveyer, means for holding the band so removed on the conveyer, band perforating means and band applying means, means for actuating the conveyer to cause it to transport a band to the perforating means where a perforation is formed in one end of the band, and thence to the band applying means where the band is applied about an article by causing an engagement of the imperforate end of the band with the perforation in its other end, and means for causing a halt in the movement of the conveyer at the perforating means whereby said band is perforated during said halt.

15. In a machine of the class described, a band container, a conveyer, suction means on the conveyer for receiving and holding on the conveyer bands removed individually from said band container, band perforating means comprising mechanism for transversely slitting a band adjacent one of its ends, mechanism for imparting a reciprocating motion to the band conveyer whereby said band is first transported to the perforating mechanism and perforated thereby and band applying mechanism to which the conveyer transports the band after the same has been perforated, said band applying mechanism causing the imperforate end of the band to engage the perforation in the other end to hold the band about an article.

16. In a machine of the class described, a band magazine for holding a stack of superposed cigar bands, a conveyer for receiving a band from said magazine and carrying the same, band perforating means to which a band is carried by the conveyer, said perforating means adapted to form a pair of transverse slits in one end of the band, and band applying mechanism for wrapping the band about a cigar and causing a tongue on the imperforate end of the band to pass through the slits in its opposite end.

17. In a machine of the class described, a conveyer for receiving a band and carrying said band, means for perforating a band carried to it by the conveyer, band applying means for receiving and applying the perforated band by causing an engagement of the imperforate end of the band with the perforation in its other end, and centering mechanism for positioning the article to receive the band.

18. In a machine of the class described, a band magazine, a conveyer for receiving a band therefrom and conveying said band, band perforating mechanism for slitting one end of the band carried by the conveyer, band applying means for receiving the perforated band and applying it to an article by interlocking the imperforate end of the band with the slits formed in the other end by the perforating mechanism, and article centering means for holding an article in position to receive the band.

19. In a machine of the class described, a band magazine for holding a stack of superposed cigar bands mechanism for removing said bands individually therefrom and mechanism for carrying the bands so removed, mechanism for perforating a band while the same is carried on said band carrying mechanism, band applying mechanism to which the perforated band is carried and which applies the band to an article by causing an engagement of the imperforate end of the band with the perforation formed in the opposite end of the band by the perforating means, and centering mechanism for positioning an article in juxtaposition to the band applying mechanism whereby said band applying mechanism may apply a band properly to said article.

20. In a machine of the class described, a band magazine, mechanism for perforating the band to provide one of the elements for holding said band about a cigar and band applying mechanism, a conveyer for receiving a band from the band magazine and transferring the same to the band perforating mechanism with a pause at the band perforating mechanism and mechanism for causing the conveyer to carry said perforated band to the band applying mechanism, said band applying mechanism causing the band to be applied about the article by causing the imperforate end of the band to engage the perforation in the other end formed by the perforating mechanism.

21. In a machine of the class described, a band magazine, a conveyer for receiving a band therefrom and carrying said band, means for placing perforations in one end of the band carried by the conveyer, the perforations produced by the perforating means forming one of the elements of the means for holding the band about an article and band applying means having tapes and fingers for actuating said tapes to cause the same to wrap a band about the article, whereby the imperforate end of the band engages the perforation in the other end, and centering means for positioning and holding the article whereby the same can be engaged by the tapes and fingers to apply the band.

22. In a machine of the class described, band applying mechanism comprising a tape, a finger for actuating said tape, means for causing said tape to wrap one end of a band about a cigar, an additional pair of tapes, fingers for actuating said last mentioned tapes to cause the same to wrap the opposite end about a cigar and cause one end of the band to enter perforations in the other end of the band.

23. In a machine of the class described, a band magazine, band applying means, a band conveyer adapted to receive a band from the band magazine and transfer the same to band applying means, band perforating mechanism comprising means for forming a pair of transverse tongue engaging slits at one end of the band while said band is at the conveyer and mechanism for moving said conveyer to carry the perforated band to the band applying means, said band applying means affixing the band about an article by causing an engagement of the tongue on the band with the slits.

24. In a machine of the class described, band applying mechanism to receive and hold a band, mechanism for folding one end of a band about an article, a finger, a tape extending over the same, said tape being normally slack, a roller over which said tape extends, a cam for engaging said tape to take up its slack whereby said tape, in conjunction with the finger over which it extends, applies the other end of the band to the article.

25. In a machine of the class described, band applying mechanism to receive and hold a band having a tongue on one of its ends and a pair of transverse slots adjacent its other end, fingers, tapes extending over said fingers to fold the slit end of the band against the article to be banded, a finger and a slack tape extending over the same and mechanism for taking up the slack in said tape to cause the tongue on the band to enter the transverse slits in the opposite end of said band.

26. In a machine of the class described, a band magazine for containing a stack of superposed bands, a conveyer for receiving the bands individually removed from said magazine, band perforating mechanism for placing a pair of transverse slits on one end of a band carried on the conveyer, band applying mechanism for receiving the perforated band from the conveyer and applying the same to the article, said band applying means adapted to first fold the perforated end of the band about the cigar, thence fold the imperforate end and cause the same to enter the slits in the perforated end, and mechanism for folding the imperforate end back upon itself after it has entered said slits.

27. In a machine of the class described, a band container, a conveyer for receiving a band removed therefrom, mechanism for perforating the band brought to it by the conveyer, said mechanism comprising a vertically movable male die, female dies secured to the same at its sides and vertically movable therewith, an upper die with which the movable die contacts comprising a central female die, a male die secured to one face of the same, a laterally movable male die movable to and from the other face of said upper female die and mechanism for reciprocating the vertically movable die, and band applying means for applying the band after the same has been acted upon by said perforating mechanism, said band applying means affixing the band about an article by causing an engagement of one end of the band with slits produced on the band by said dies.

28. In a machine of the class described, a band container, a conveyer for receiving a band removed therefrom, mechanism for perforating the band brought to it by the conveyer, said mechanism comprising a fixed female die, a fixed male die secured thereto, a laterally movable male die secured to the male and female dies, mechanism for moving said laterally movable male die to and from the female die and complementary dies movable to and from the said male and female dies and means for reciprocating said complementary dies and band applying means for applying the band after the same has been acted upon by said perforating mechanism, said band applying means affixing the band about an article by causing an engagement of one end of the band with slits produced on the band by said dies.

29. In a machine of the class described, band applying means having a platen and means for holding a band on the bottom thereof, tapes secured to said platen on each side thereof, means for causing said tapes to wrap a band about an article, and mechanism for causing one end of the band to enter perforations at the other end of the band.

30. In a machine of the class described, band applying means having a platen mounted on a vertically disposed spindle, means for raising and lowering the same, means for securing a band at its lower surface, tapes and means for causing said tapes to wrap a band about an article, means for causing said band to be secured to said article by having one end enter perforations, and mechanism for folding one end of said band back upon itself whereby the band is secured in said perforations.

31. In a machine of the class described, band applying mechanism having a platen mounted to move vertically, means for causing suction at its lower surface so that a band may be held thereon, tapes secured to said platen, means for causing said tapes to wrap said band about an article, a tongue movable in and out of perforations in the band, and mechanism for causing the tongue to separate from the band as engagement of the ends of the band takes place.

32. In a machine of the class described, band applying means having a platen and means on said platen for lowering the same, suction means for holding a band on the bottom of said platen, tapes secured to said platen, fingers over which said tapes run, and a tongue adapted to coöperate with said tapes and fingers for causing the ends of the bands to engage.

33. In a machine of the class described, band applying means having a platen and means for mounting the same so that it may rise and fall in a vertical direction, an exhaust for securing a band to the lower surface of said platen, tapes secured to said platen, a tongue coöperating with said tapes and adapted to aid them in securing together the ends of the band by causing one end to pass through a perforation in the other end and a swelling on said tongue to facilitate this operation.

34. In a machine of the class described, band applying means for applying to an article a band having a perforated end and an imperforate end, mechanism for causing the imperforate end of the band to enter the perforations in the perforated end, a tongue adapted to enter the perforations in said band and spread the same to allow a ready entry of the imperforate end of the band, said tongue having a swelling for enlarging said perforations and ears for limiting its movement through said perforations.

35. In a machine of the class described, band applying means having a platen with means for holding a band on its lower surface, tapes secured to said platen and adapted to wrap said band about an article, a tongue adapted to coöperate with said tapes in the securing together of the ends of said band, and a folder having a lateral and a down and up motion.

36. In a machine of the class described, band applying means having a platen adapted to retain a band on its lower surface, tapes secured to said platen, a tongue and means for actuating the same adapted to coöperate with said tape, fingers over which said tapes pass and means for actuating said fingers, and a yoke on one of said fingers adapted to coöperate in the securing of the band about the article.

37. In a machine of the class described, mechanism for placing a band about an article and leaving a protruding tongue, a folder having a projection and means for giving the folder a transverse movement, and a cam adapted to engage said projection and give the folder a down and up movement whereby the tongue may be folded back upon the band.

38. In a machine of the class described, mechanism for placing a band about an article so that a tongue will protrude from the band, a folder and means for giving the folder a transverse movement, a projection on said folder and a cam adapted to engage said projection for giving said folder a down and then an up movement as it folds the protruding end, and means for keeping said projection against said cam.

FRANCIS X. MALOCSAY.